United States Patent [19]

Suzuki

[11] Patent Number: 5,487,055
[45] Date of Patent: Jan. 23, 1996

[54] INFORMATION RECORDER WITH TRACKING AND SEEKING OPERATIONS USING LOW FREQUENCY TRACKING AND LENS POSITION SIGNALS

[75] Inventor: Haruyuki Suzuki, Yokohama, Japan

[73] Assignee: Ricoh Company, Ltd., Tokyo, Japan

[21] Appl. No.: 196,298

[22] Filed: Feb. 14, 1994

[30] Foreign Application Priority Data

Feb. 19, 1993 [JP] Japan ..................................... 5-030675

[51] Int. Cl.$^6$ .................................................. G11B 7/085
[52] U.S. Cl. ..................... 369/44.28; 369/32; 369/44.34; 369/44.29
[58] Field of Search .............................. 369/44.28, 44.29, 369/44.32, 44.27, 32, 44.34; 360/78.05, 78.06, 73.01, 73.02, 78.07

[56] References Cited

U.S. PATENT DOCUMENTS

| | | | |
|---|---|---|---|
| 5,109,366 | 4/1992 | Moriya et al. | 369/44.29 |
| 5,163,033 | 11/1992 | Yanagi | 369/44.28 |
| 5,241,522 | 8/1993 | Yanagi | 369/44.28 |
| 5,351,222 | 9/1994 | Ikeda et al. | 369/44.25 |

FOREIGN PATENT DOCUMENTS

| | | |
|---|---|---|
| 3194776 | 8/1991 | Japan . |
| 3256274 | 11/1991 | Japan . |
| 3259469 | 11/1991 | Japan . |
| 5174393 | 7/1993 | Japan . |
| 5307844 | 11/1993 | Japan . |

Primary Examiner—W. R. Young
Assistant Examiner—Thang V. Tran
Attorney, Agent, or Firm—Cooper & Dunham

[57] ABSTRACT

In an information recorder, a low frequency region component of a tracking error signal is extracted by a digital filter in a track following mode. In a seek mode, an actuator for an objective lens is driven in accordance with a signal obtained by adding a value indicative of this low frequency region component to a speed error between moving and target speeds of a light spot. Driving force for canceling a displacement of the light spot caused by inclination and vibration of the information recorder is added to seek driving force for performing a seeking operation so that influences of the inclination and vibration of the information recorder can be compensated. Thus, the seeking operation can be performed stably and accurately in spite of the inclination and vibration of the information recorder and eccentricity of a disk.

5 Claims, 8 Drawing Sheets

INFORMATION RECORDER WITH TRACKING AND SEEKING OPERATIONS USING LOW FREQUENCY TRACKING AND LENS POSITION SIGNALS

BACKGROUND OF THE INVENTION

1. Field of the Invention

The present invention relates to an information recorder such as an optical disk unit, a magnetooptic disk unit, etc. for irradiating a light spot to a rotating disk-shaped recording medium and recording and regenerating information with respect to tracks on the recording medium. More particularly, the present invention relates to an information recorder of this kind for controlling a seeking operation in which the light spot is moved from one track to another track.

2. Description of the Related Art

For example, Japanese Patent Application Laying Open (KOKAI) No. 2-33731 shows a device for performing the seeking operation of this kind. This device as a general example relates to an optical disk unit. In this device, a track pulse is generated every time a light spot crosses a track on an optical disk. The number of track pulses is counted by an updown counter preset to a small value. The optical disk unit makes a reference speed signal proportional to this counting value as an absolute value. A moving speed of the light spot is detected from the frequency of a track pulse. An actuator for slightly moving an objective lens (i.e., the light spot) is driven by a difference signal between a signal indicative of this moving speed and the reference speed signal. Thus, the objective lens (i.e., the light spot) is relatively displaced with respect to an optical head. A seek motor is driven by a signal proportional to an amount of this displacement. Accordingly, the optical head is moved in accordance with the movement of the objective lens (i.e., the light spot). When the counting value of the updown counter is equal to a set value, counting directions of this counter are switched. When the counting value of the updown counter is equal to −1, this counter is reset and the seeking operation is completely performed.

In the general example, the moving speed of the light spot with respect to a track is controlled such that this moving speed is in conformity with a reference or target speed. However, when the entire disk unit is inclined, no error between the moving and reference speeds can be sufficiently reduced to a small value. This problem will next be described with reference to FIG. 8.

In FIG. 8, reference numerals 401 and 402 respectively designate an optical disk and an objective lens. An actuator 404 slightly displaces the objective lens 402 with respect to an optical head in a direction perpendicular to a track. Namely, the actuator 404 slightly displaces a light spot converged by this objective lens 402 with respect to the optical head in a direction perpendicular to a track. Reference numeral 403 designates a horizontal plane. An inclination angle of the entire disk unit is set to θ. The mass of a movable portion (i.e., the optical head) including the objective lens is set to m. In this case, force $f=mg\sin\theta$ (g is a gravitational acceleration) is applied to the movable portion in a direction crossing the track.

In this case, if the movable portion is set to an inertial system, force equal to the above force f and having an opposite direction must be applied to the objective lens 402 so as to relatively move the light spot with respect to the optical disk 401 at an equal speed in the track crossing direction. However, in the above general example, such force is not applied to the objective lens 402 so that a speed error corresponding to this unapplied force is caused.

When an external vibration is applied to the disk unit, the speed error is also caused even when no entire disk unit is inclined. The optical disk 402 is supported by a spindle motor integrated with the disk unit. Accordingly, the optical disk 402 is moved together with the vibration of the disk unit. In contrast to this, the movable portion is supported by a bearing, a spring, etc. with respect to the disk unit. The movable portion tends to be held by law of inertia in a position irrespective of the vibration. Therefore, the speed error is also caused by the external vibration as mentioned above. Force ma must be applied to the movable portion so as to move the light spot at an equal speed with respect to a track when the optical disk 402 is vibrated at an acceleration a. A speed error corresponding to this force ma is caused.

When such a speed error is caused, the seeking operation tends to be unstable so that no seeking operation can be reliably performed.

It is sufficient to increase a loop band region of speed control to reduce the speed error. However, in reality, no loop band region can be greatly increased in view of influences of mechanical resonance of the movable portion, etc. Accordingly, it is necessary to take different measures for reducing the speed error.

SUMMARY OF THE INVENTION

It is therefore an object of the present invention to provide an information recorder such as an optical disk unit for reducing a speed error and stably performing a seeking operation even when the information recorder is inclined and externally vibrated.

In accordance with a first structure of the present invention, the above object can be achieved by an information recorder comprising light spot displacing means for displacing a light spot irradiated onto a rotating disk-shaped recording medium in a direction crossing a track on the recording medium; means for operating the light spot displacing means in a track following mode for making the light spot follow up an arbitrary track on the recording medium in accordance with a tracking error signal indicative of a shift in relative position between the light spot and this follow-up track; extracting means for extracting a low frequency region component from the tracking error signal in the track following mode; and means for operating the light spot displacing means in a seek mode for making the light spot cross the track in accordance with a value obtained by adding a value indicative of the low frequency region component extracted by the extracting means to a speed difference between a track crossing speed and a target speed of the light spot.

In accordance with a second structure of the present invention, the above object can be also achieved by an information recorder comprising light spot displacing means for displacing a light spot irradiated onto a rotating disk-shaped recording medium in a direction crossing a track on the recording medium; means for operating the light spot displacing means in a holding mode for holding an optical axis of the light spot in a reference position in accordance with a signal indicative of an optical axis shift between the optical axis of the light spot and the reference position; extracting means for extracting a low frequency region component from the signal indicative of the optical axis shift in the holding mode; and means for operating the light spot displacing means in a seek mode for making the light spot cross the track in accordance with a value obtained by adding a value indicative of the low frequency region component extracted by the extracting means to a speed difference between a track crossing speed and a target speed of the light spot.

In accordance with a third structure of the present invention, the above object can be also achieved by an information recorder comprising light spot displacing means for displacing a light spot irradiated onto a rotating disk-shaped recording medium in a direction crossing a track on the recording medium; first driving means for operating the light spot displacing means in a track following mode for making the light spot follow up an arbitrary track on the recording medium in accordance with a tracking error signal indicative of a shift in relative position between the light spot and this follow-up track; first extracting means for extracting a low frequency region component from the tracking error signal in the track following mode; second driving means for operating the light spot displacing means in a holding mode for holding an optical axis of the light spot in a reference position in accordance with a signal indicative of an optical axis shift between the optical axis of the light spot and the reference position; second extracting means for extracting a low frequency region component from the signal indicative of the optical axis shift in the holding mode; and third driving means for operating the light spot displacing means in a seek mode for making the light spot cross the track in accordance with a value obtained by adding a value indicative of the low frequency region component extracted by the first extracting means to a speed difference between a track crossing speed and a target speed of the light spot when a seek distance is equal to or smaller than a predetermined value; the third driving means operating the light spot displacing means in the seek mode in accordance with a value obtained by adding a value indicative of the low frequency region component extracted by the second extracting means to the speed difference when the seek distance is greater than the predetermined value.

As mentioned above, in the information recorder of this kind, the recording medium is generally supported on a spindle motor arranged in a recorder body. In contrast to this, a movable portion (a so-called optical head) relative to the light spot is attached to the recorder body through a bearing, a spring, etc. Therefore, when the recorder is inclined or an external impact is applied to the recorder, the movable portion is accelerated such that the light spot and the recording medium are relatively displaced. It is necessary to apply driving force for overcoming such acceleration caused by the inclination and vibration to the movable portion so as to make the light spot follow up a track or hold the optical axis of the light spot on a reference optical axis. The low frequency region component of a tracking error signal extracted in the track following mode corresponds to such driving force. Otherwise, the lower frequency region component of a signal indicative of a shift in optical axis extracted in the holding mode corresponds to such driving force.

In accordance with each of the first to third structures of the present invention, such driving force is added to driving force for performing a seeking operation in an accelerating or decelerating direction. Therefore, a speed error caused by inclination and vibration is compensated so that the seeking operation is performed stably and reliably.

Eccentricity of the recording medium is also a factor for causing the speed error at a seek time. Accordingly, it is also preferable to compensate the speed error caused by this eccentricity at the seek time. The low frequency region component of the tracking error signal extracted in the track following mode also includes a component for compensating a relative displacement between a track and the light spot caused by such eccentricity.

The seek mode is normally switched from the track following mode. Accordingly, when a seek distance is sufficiently short, i.e., when the seeking operation is completely performed for a time sufficiently shorter than a time for one rotation of the recording medium, it is considered as a supposition that there is almost no difference in eccentricity of the recording medium between a track following time just before the seek start and a seek period. In the third structure of the present invention, when the seek distance is short, force indicative of the low frequency region component of the tracking error signal extracted in the track following mode is added to seek driving force. Accordingly, influences of the eccentricity of the recording medium are also compensated and the seeking operation can be performed stably and accurately even when the eccentricity of the recording medium is large.

In contrast to this, when the seek distance is long, the above supposition does not necessarily hold good. Accordingly, there is a possibility of reverse effects when the low frequency region component of the tracking error signal extracted in the track following mode is added. In the third structure of the present invention, when the seek distance is long, force indicative of the low frequency region component of the optical axis shift signal extracted in the holding mode is added to the seek driving force so that such a possibility can be avoided.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an information recorder in the present invention will next be described in detail with reference to the accompanying drawings.

Embodiment 1

Figure 1:
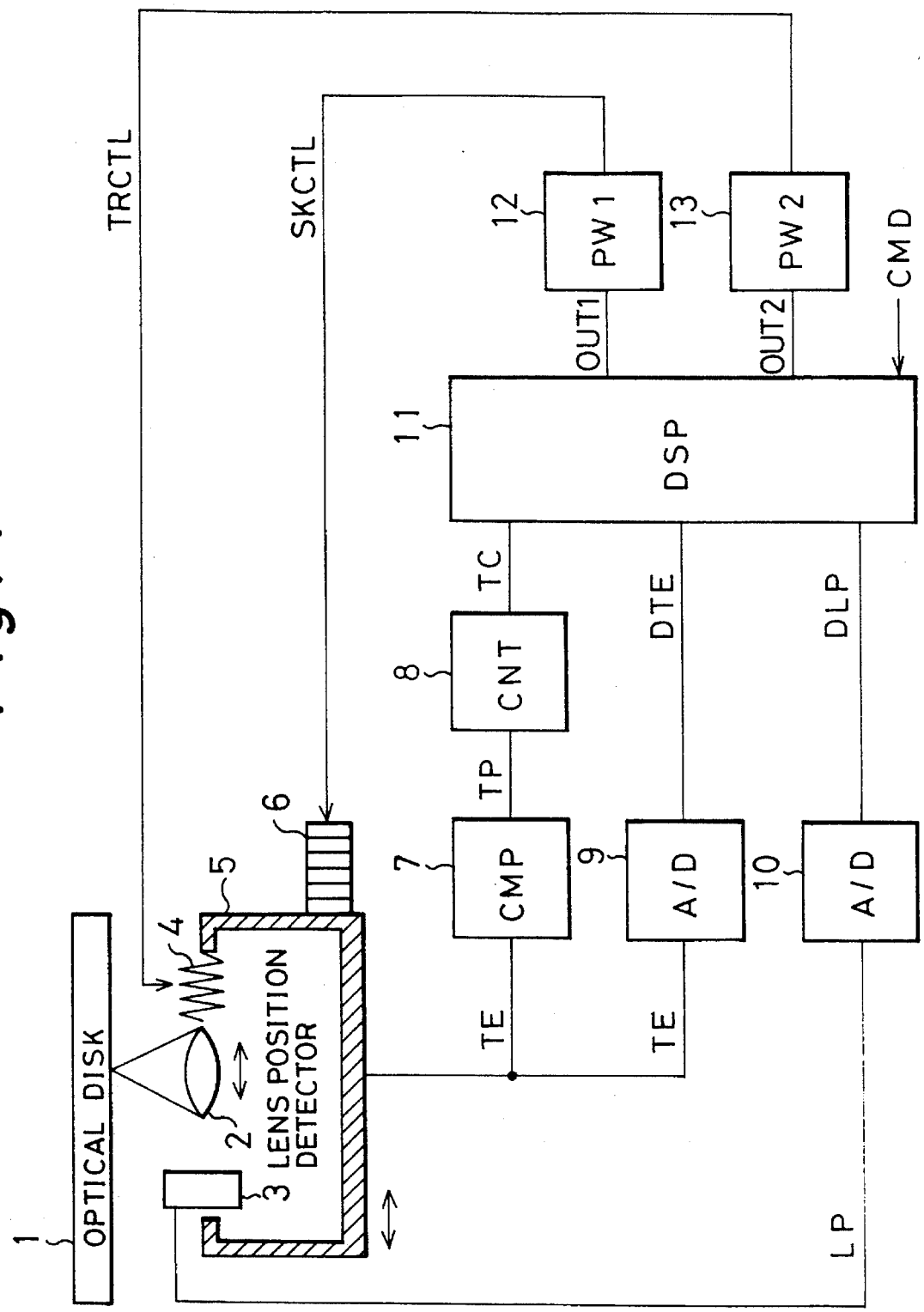
FIG. 1 is a view showing the schematic construction of an optical disk unit in accordance with one embodiment of the present invention.

FIG. 1 shows a main portion of the construction of an optical disk unit in accordance with this Embodiment 1 and embodiments described later. An optical disk 1 is rotated by an unillustrated spindle motor at a high speed. A track for recording information is formed on a concentric circle on the optical disk 1.

An optical head 5 has a well-known construction. For example, a seek motor 6 is constructed by a voice coil motor. The optical head 5 can be greatly moved by driving the seek motor 6 with respect to the optical disk 1 in its radial direction perpendicular to the track.

An objective lens 2 is attached to a front portion of the optical head 5 by a bearing, a single spring, etc. A light beam is emitted from an unillustrated laser beam source within the optical head 5. The light beam is converged by the objective lens 2 and is formed as a light spot on the optical disk 1. The objective lens 2 can be slightly moved by driving an actuator 4 relatively with respect to the optical head 5 in a direction perpendicular to the track. When the objective lens 2 is slightly moved, an optical axis of the light spot on the optical disk 1 is also slightly moved relatively with respect to a reference optical axis of the optical head 5 in a direction perpendicular to the track.

Light of the spot reflected on the optical disk I is converged by the objective lens 2 and is inputted to an unillustrated optical system within the optical head 4. A tracking error signal TE is made by this optical system and an unillustrated well-known signal processing circuit. This tracking error signal TE shows a shift in the light spot from a track center of the optical disk. The tracking error signal TE is generally formed as a well-known sine wave-shaped signal with a track pitch as one period.

A lens position detector 3 detects a relative displacement of the objective lens 2 with respect to the optical head 5. The detected relative displacement of the objective lens 2 is outputted as a lens position signal LP. In other words, a shift in the optical axis of the light spot with respect to the reference optical axis of the optical head 5 is outputted as the lens position signal LP.

The optical axis of the light spot may be displaced by using a means for slightly rotating a mirror, etc. arranged on an optical path between the laser light beam source and the objective lens 2. In this case, the displacement of the optical axis of the light spot is detected by arranging a detector for detecting a position or angle of this mirror, etc.

A waveform of the tracking error signal TE is shaped by a zero cross comparator 7 and this shaped signal is changed to a track pulse TP corresponding to track crossing of the light spot. This track pulse TP is counted by a counter 8. This counter 8 is reset at a starting time of a seeking operation and a counting operation of the counter 8 is started from zero. A counting value TC of the counter 8 is inputted to a digital signal processor 11. The tracking error signal TE and the lens position signal LP are respectively converted to digital values DTE and DLP by analog/digital converters 9 and 10. The converted digital values DTE and DLP are also inputted to the digital signal processor 11.

The digital signal processor 11 is constructed by a microcomputer for high speed processing of a digital signal. The digital signal processor 11 includes a multiplier, an adder, a subtracter, a memory, a control circuit, etc. The digital signal processor 11 can perform various kinds of operations and input-output processings, etc. This digital signal processor 11 has outputs OUT1 and OUT2 of two systems. A driving circuit 12 supplies a driving current corresponding to a digital value of the output OUT1 to the seek motor 6. A driving circuit 1S supplies a driving current corresponding to a digital value of the output OUT2 to the actuator 4.

Figure 2:
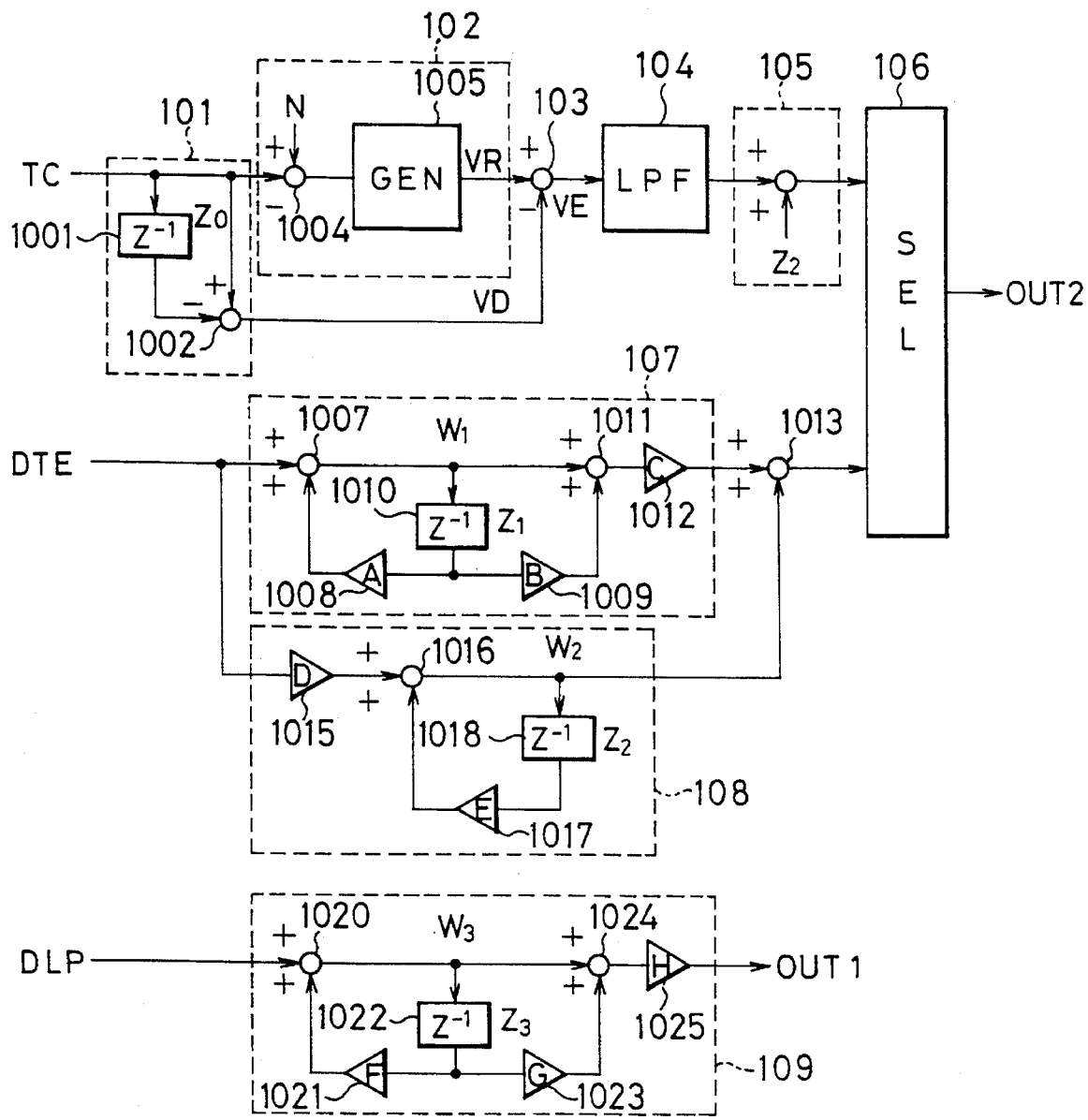
FIG. 2 is a block diagram showing processed contents of a digital signal processor in Embodiment 1 of the present invention.
Figure 3:
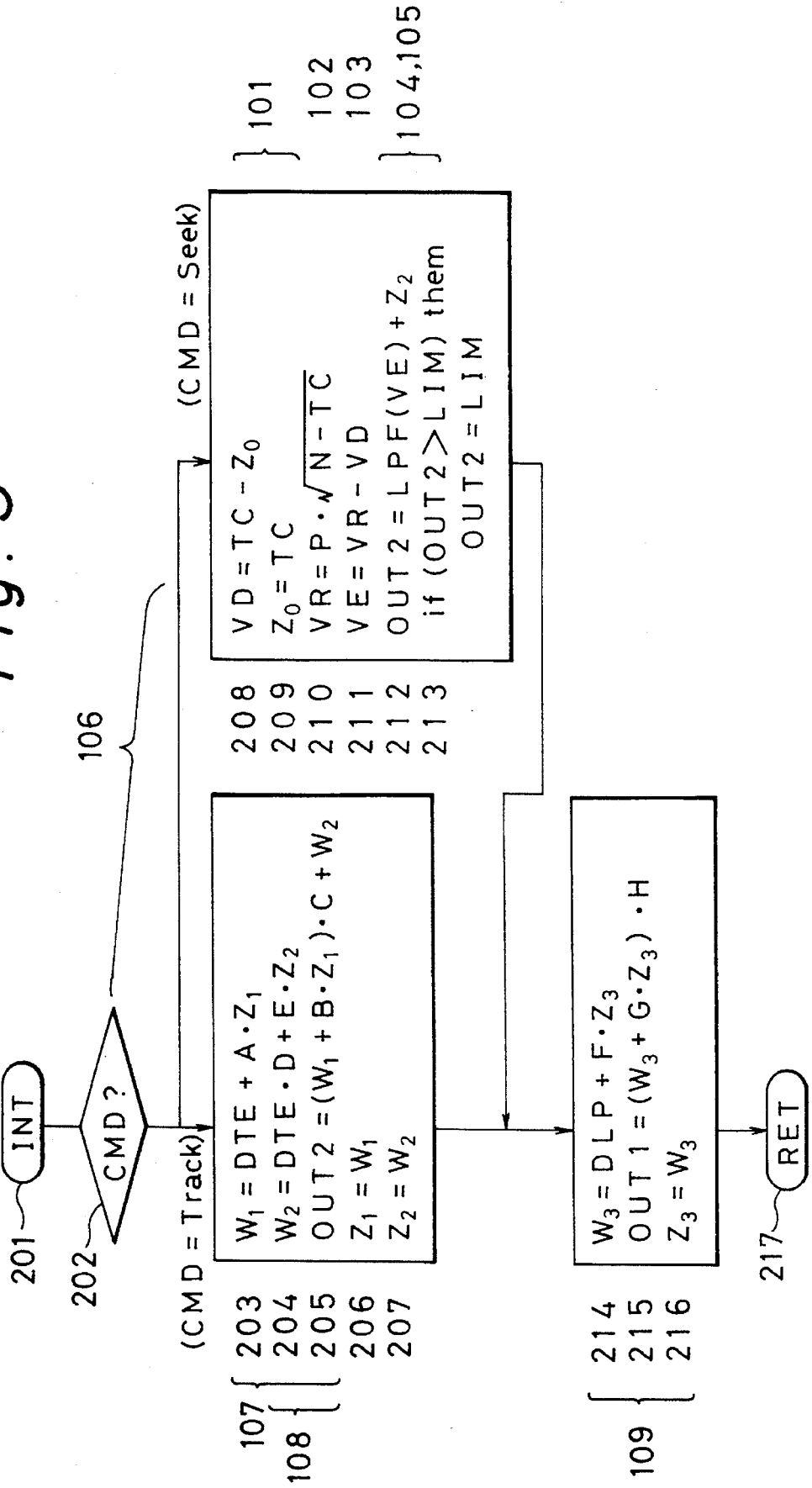
FIG. 3 is a flow chart showing a processing algorithm of the digital signal processor in the Embodiment 1.

FIG. 2 is a block diagram of contents of signal processing realized by software in the digital signal processor 11. FIG. 3 is a flow chart of a software algorithm for realizing these processing contents. In FIGS. 2 and 3, the same numbers or reference numerals respectively designate the same processing portions, variables or constants.

FIG. 2 will first be explained. The meanings of symbols used in FIG. 2 are shown in a right-hand side portion of FIG. 2. An alphabet such as $Z_0$, etc. added to a unit time delay unit means a value delayed by this unit time delay unit. Namely, this alphabet means an input value before one unit time. As can be seen from comparison of FIGS. 2 and 3, the unit time delay unit is represented by one variable such as $Z_0$, etc. on software. A coefficient multiplier is represented by constant multiplication on software.

Reference numeral 101 designates a speed detector. The counting value TC of the counter 8 shows a moving amount of the light spot with a track as a unit. Accordingly, the present counting value TC is inputted to a subtracter 1002. A counting value TC, i.e., $Z_0$ before one unit time delayed by the unit time delay unit 1001 is also inputted to the subtracter 1002. An output VD (=$TC-Z_0$) of the subtracter 1002 shows a moving amount of the light spot per unit time. Namely, this output VD shows a moving speed of the light spot.

Reference numeral 102 designates a generator of a target seek speed. The number N of tracks to be sought is provided from an unillustrated host device. As mentioned above, the counter 8 is reset by an unillustrated reset means simultaneously when the seeking operation is started. The counting value TC of this counter 8 is started from zero. Accordingly, an output (N−TC) of a subtracter 1004 shows the number of remaining tracks until a target track. A generator 1005 generates a target speed VR having a monotonous increasing relation with respect to the number of remaining tracks. In this monotonous increasing relation, the target speed VR is reduced as the number of remaining tracks is reduced. The target speed VR is preferably set to a square root of the number (N−TC) of remaining tracks. Such a generator 1005 may be constructed by an arithmetic unit for directly calculating this square root, or may be constructed by a ROM addressed in accordance with the number of remaining tracks.

A subtracter 103 calculates a speed error VE of the light spot. Namely, the subtracter 103 calculates a difference (VR−VD) between the target speed VR and the moving speed VD of the light spot.

This speed error VE is smoothed by a low-pass filter (LPF) 104. This low-pass filter 104 is constructed by a digital low-pass filter. For example, the low-pass filter 104 may have a construction similar to that of a low-pass filter 108 described later. Such a digital filter can be easily realized by software in accordance with a well-known signal processing theory. This low-pass filter 104 preferably has a DC gain for providing a suitable loop gain of speed control.

An adder 105 adds an output of the low-pass filter 104 to a variable $Z_2$ described later. An output of this adder 105 is transmitted to the output OUT2 through a selector 106 when a seek mode is selected. Accordingly, in the seek mode, the actuator 4 is driven such that the moving speed VD of the light spot is in conformity with the target speed VR.

Each of reference numerals 107, 108 and 109 designates a digital filter. The digital filter 107 is used to compensate a phase of the tracking error signal TE. The digital filter 107 is constructed by adders 1007, 1011, coefficient multipliers 1008, 1009 for constant multiplication, and a unit time delay unit 1010. Constant coefficients A and B of the coefficient multipliers 1008 and 1009 are determined such that the digital filter 107 has phase lead-lag characteristics. The digital filter 108 is used to extract a low frequency region component from the tracking error data DTE. The digital filter 108 is constructed by coefficient multipliers 1015, 1017, an adder 1016 and a unit time delay unit 1018. Constant coefficients D and E of the coefficient multipliers 1015 and 1017 are determined such that the digital filter 108 has low-pass filter characteristics. The digital filter 109 is used to compensate a phase of the lens position data DLP as a shifting amount of the optical axis and has phase lead-lag characteristics. The digital filter 109 is constructed by adders 1020, 1024, coefficient multipliers 1021, 1025, 1025 and a unit time delay unit 1022.

The tracking error data DTE are inputted to the digital filters 107 and 108. Outputs of the digital filters 107 and 108 are added to each other by an adder 1013. An output of this adder 1013 is transmitted to the output OUT2 through a selector 106 when a track following mode is selected. Accordingly, in the track following mode, the actuator 4 is driven such that the tracking error signal TE or the digital value DTE is set to zero. The light spot follows up a track in the track following mode.

The digital filter 108 extracts a low frequency region component from the tracking error data DTE. When the entire disk unit is inclined in the track following mode, force for making the light spot follow up the track in spite of this inclination can be generated by the actuator 4 by adding this extracted low frequency region component to the output of the digital filter 107.

The variable $Z_2$ as a low frequency region component of the tracking error data DTE extracted by the digital filter 108 is an output value of the unit time delay unit 1018 and is also added to an output of the low-pass filter (LPF) 104 as a speed error. Thus, the speed error in the seek mode is reduced and the seeking operation can be performed stably and accurately even when the entire disk unit is inclined and vibrated.

The lens position data DLP are inputted to the digital filter 109 to compensate a phase thereof. Compensated data of the digital filter 109 are transmitted to the output OUT1. The seek motor 6 is driven in accordance with the compensated data. Further, the optical head 5 is moved such that a displacing amount of the objective lens with respect to the optical head 5 is reduced. This displacing amount is a shifting amount of the optical axis of the light spot from the reference optical axis. Thus, the optical head 5 approximately follows up a track in the track following mode. In the seek mode, the optical head 5 follows up the light spot and is moved such that the optical head 5 crosses a track.

Figure 5:
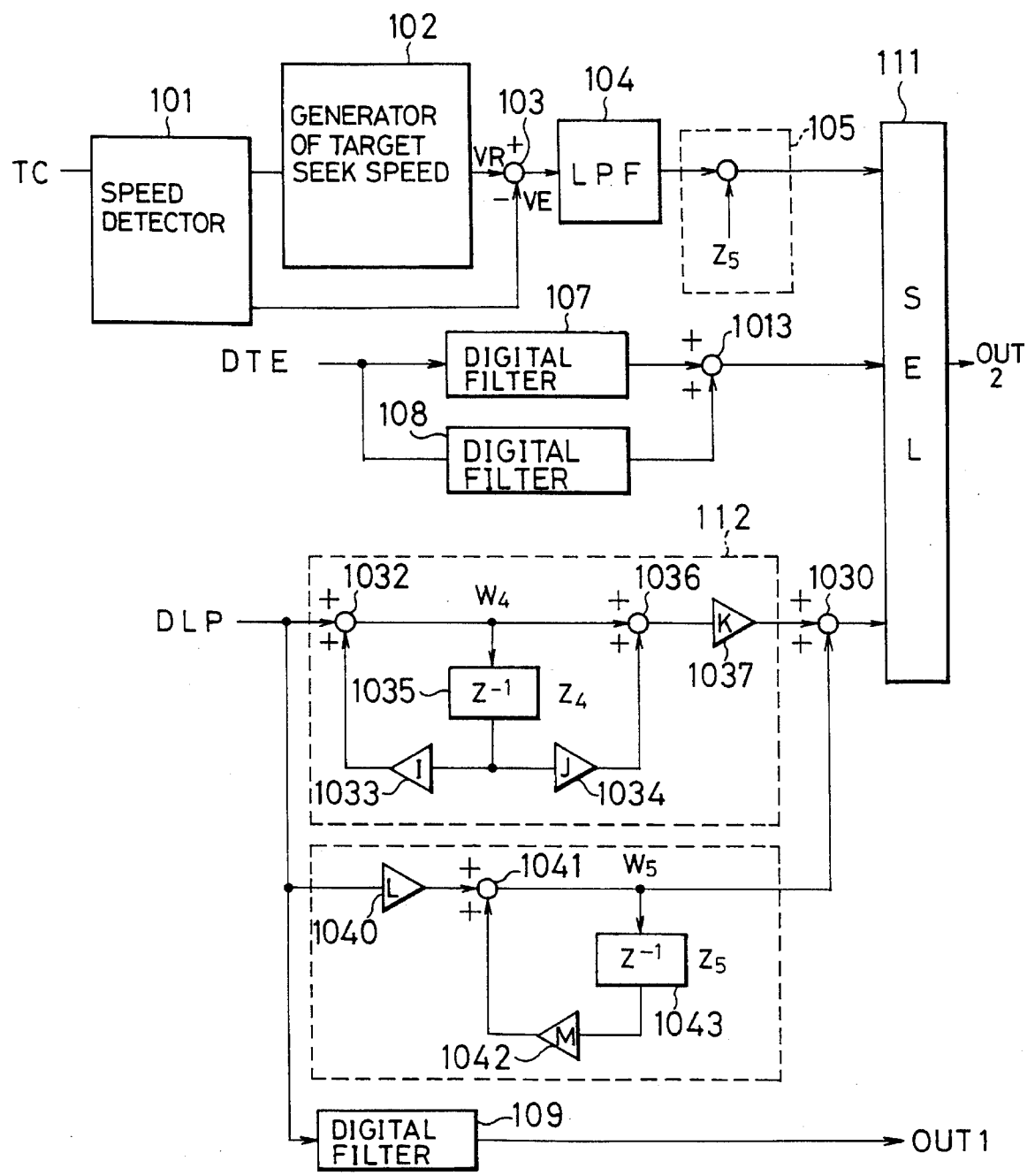
FIG. 5 is a simplified block diagram showing processed contents of a digital signal processor in Embodiment 2.

FIG. 3 will next be explained. Software shown in FIG. 5 is periodically executed by interruption at a constant time interval which is set to a unit time interval as mentioned above. This software is branched by command CMD inputted from an unillustrated host device in a first interruption.

A step 201 shows start of execution of interrupt processing. In a step 202, the command CMD is read. When the command CMD is equal to a track following command Track, processings in the track following mode from step 203 to step 207 are executed. In contrast to this, when the command CMD is equal to a seek command Seek, processings in the seek mode from step 208 to step 213 are executed. Namely, this branch corresponds to a selection of the selector 106 shown in FIG. 2. Subsequently, processings from step 214 to step 216 are executed and the interrupt processing is terminated in step 217.

Steps 203 to 205 correspond to an operation of the digital filter 107 shown in FIG. 2. Steps 204 and 205 correspond to an operation of the digital filter 108 shown in FIG. 2. Reference numerals W1 and W2 designate temporary variables as outputs of adders 1007 and 1018 of the digital filters 107 and 108. In the step 205 corresponding to an operation of the selector 108, values of the temporary variables W1 and W2 are transmitted to the output OUT2. Thereafter, these values of the temporary variables M1 and M2 are respectively substituted for variables Z1 and Z2 in steps 206 and 207 in preparation for the next interruption. Namely, this substitution corresponds to operations of the unit time delay units 1010 and 1018.

Processings from step 208 to step 209 correspond to an operation of the speed detector 101. Processings from step 210 to step 211 correspond to operations of the target speed generator 102 and the subtracter 103. Processings from step 212 to step 213 correspond to operations of the digital low-pass filter 104, the adder 105 and the selector 106. LPE(VE) in the step 212 is a function for performing processings similar to processings from step 204 to step 205 with respect to the speed error VE. In the step 213, a value of the output OUT2 is limited to a predetermined value LIM so as to limit acceleration of the objective lens 2 such that the massive optical head 5 can be moved in accordance with the movement of the objective lens 2 or the light spot at an initial stage of the seeking operation.

Figure 4:
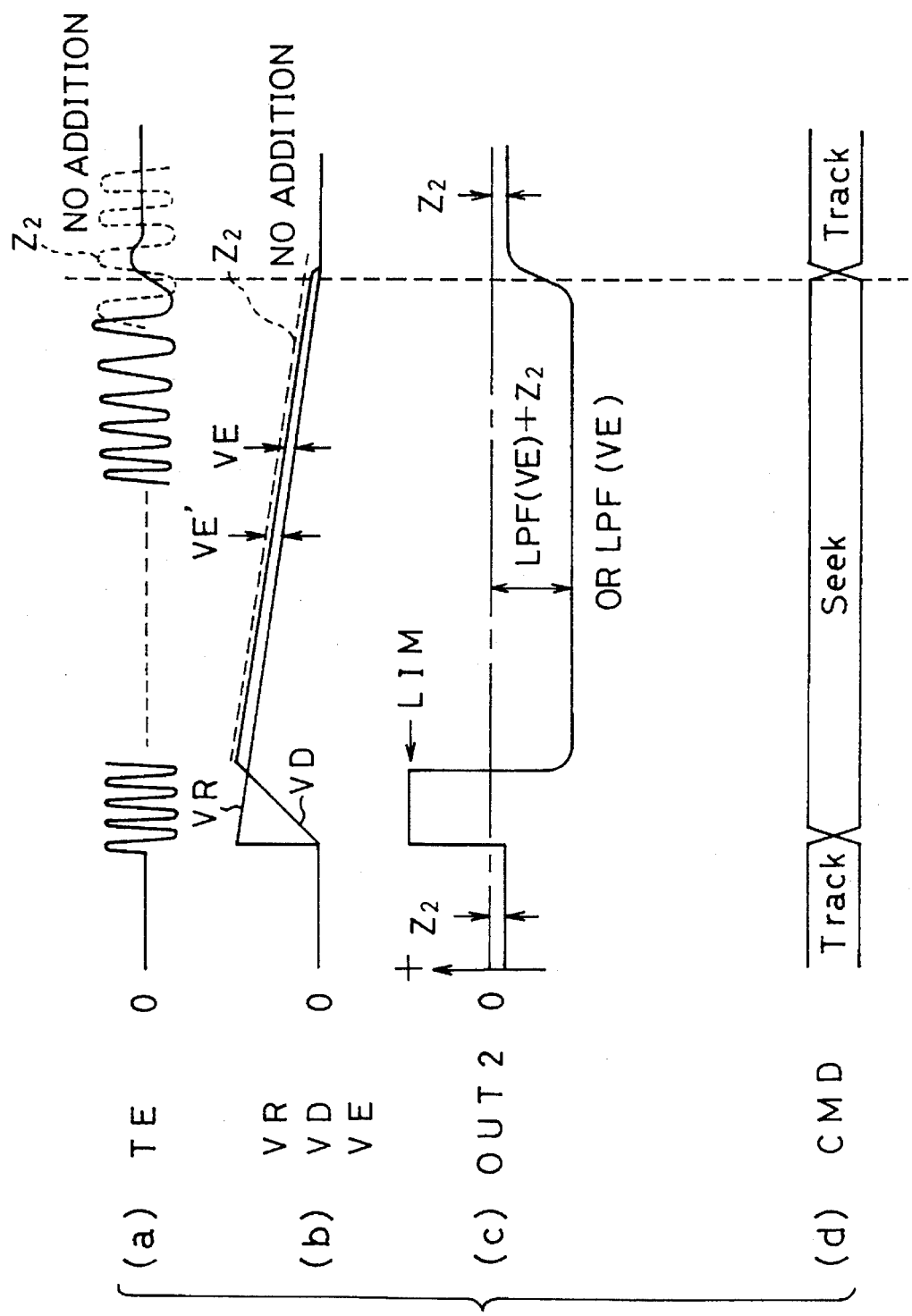
FIG. 4 is a waveform chart for explaining an operation of the optical disk unit in the Embodiment 1.

FIG. 4 is a waveform chart for explaining an operation of the disk unit when the seeking operation is performed by switching the track following mode to the seek mode and the seek mode is then switched and returned to the track following mode. In FIG. 4, item (a) shows a tracking error signal TE. Item (b) shows a moving speed VD of the light spot, a target speed VR of the light spot and a speed error VE. Items (c) and (d) respectively show an output OUT2 and command CMD, i.e., an operating mode. VE' in the item (b) shows a speed error provided when no low frequency region component ($Z_2$) of the tracking error signal TE is added by the adder 105 shown in FIG. 2.

In the track following mode, an output of the adder 1013 shown in FIG. 2 is transmitted to the output OUT2 and the light spot follows up a track. In the track following mode, a voltage of the tracking error signal TE is approximately equal to zero. When the disk unit is inclined or vibrated in this track following mode, a low frequency region component having a magnitude and a polarity corresponding to a magnitude and a direction of an acceleration of the disk unit is caused with respect to the tracking error signal TE. This low frequency region component is extracted by the digital filter 108 and is transmitted to the output OUT2 as a value $Z_2$ (or $W_2$). As a result, the actuator 4 moves the objective lens 2 in a direction and a magnitude for canceling an acceleration of the objective lens 2 caused by the above inclination and vibration. Thus, the light spot is held at the center of a track.

The seek mode will next be described. In the seek mode, TC=0 is first formed so that the target speed VR is a large value corresponding to the number N of tracks to be sought. Further, the moving speed VD of the light spot is approximately equal to zero so that the speed error VE=VR−VD is a large value. Accordingly, in an example shown in FIG. 4, a value limited by the limit value LIM is transmitted to the output OUT2. The objective lens 2 is accelerated by driving force corresponding to this transmitted value of the output OUT2. Thus, the objective lens 2 or the light spot is moved onto a central side of the optical disk 1 or an opposite side thereof. The seek motor 6 is driven in accordance with a value of the output OUT1 so that the optical head 5 is moved and follows up the light spot.

The number (N−TC) of remaining tracks is reduced in accordance with the movement of the light spot so that the target speed VR is also reduced. The moving speed VD of the light spot is gradually increased. When VD>VR is formed, the speed error VE becomes a negative value and the value of the output OUT2 also becomes negative so that the light spot begins to be decelerated. The optical head 5 is also decelerated in accordance with the deceleration of the light spot. Accordingly, the speed error VE is approximately equal to a constant value during the deceleration. When the number of remaining tracks is equal to zero, the seeking operation is completely performed so that the seek mode is switched to the track following mode.

When the seek mode has been switched to the track following mode, the moving speed VD of the light spot is equal to the speed error VE since VR=0 is formed. When the moving speed VD is a large value at this time, the light spot overruns a target track even when the operating mode is returned to the track following mode. In contrast to this, when the moving speed VD is a small or negative value (a moving direction of the light spot is opposite to a seeking direction), the light spot slowly reaches the target track or no light spot permanently reaches the target track even when the track following mode is started. Accordingly, the moving speed VD must be set to a positive value within a certain suitable range when the seek mode is switched to the track following mode.

In a general disk unit, the moving speed VD is set to a value outside the suitable range or a negative value in a certain case by inclination and vibration of the disk unit when the seek mode is switched to the track following mode. In accordance with the present invention, as shown in FIG. 4, the actuator 4 is driven by using a value obtained by adding the low frequency region component $Z_2$ or W2 of the tracking error signal TE to a speed error, thereby solving such a problem.

FIG. 4 shows a case in which the entire disk unit is inclined and the seeking operation is performed in a downward direction of this inclination. The relation in polarity of the actuator 4 is set such that the actuator 4 generates driving force in this downward inclining direction when a value of the output OUT2 is positive. In the track following mode, the low frequency region component $Z_2$ is negative so that driving force for accelerating the objective lens 2 in an upward inclining direction is generated. The light spot is held on a track by balancing this acceleration and an acceleration provided by the inclination. At a seek time, this low frequency region component $Z_2$ is added to the speed error VE so that the objective lens 2 can be decelerated while the speed error VE is held at a positive value within the above suitable range even when the entire disk unit is inclined. Namely, the low frequency region component $Z_2$ is used to increase force for braking a downward movement of the objective lens 2.

In contrast to this, when no $Z_2$ is added to the speed error VE, decelerating force of the objective lens 2 is determined by only a speed error VE' so that this speed error VE' is larger than the speed error VE. As a result, when the seeking operation is completed and the number of remaining tracks is equal to zero, no moving speed VD is sufficiently reduced. Therefore, the light spot overruns a target track when the seek mode is switched to the track following mode.

Embodiment 2

Similar to the above Embodiment 1, an optical disk unit in this Embodiment 2 is constructed as shown in FIG. 1.

Figure 6:
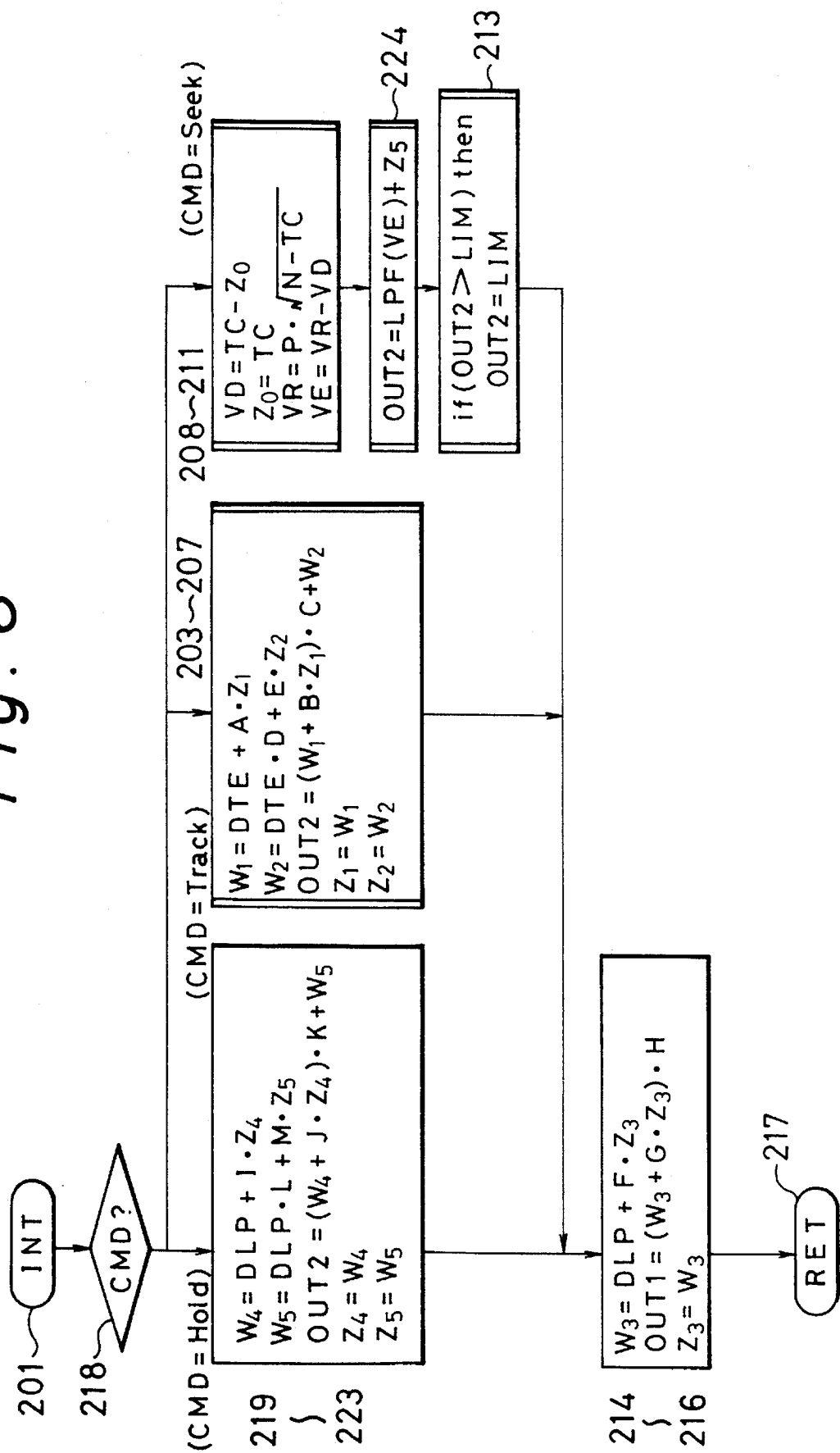
FIG. 6 is a simplified flow chart showing a processing algorithm of the digital signal processor in the Embodiment 2.

FIG. 5 is a block diagram showing contents of signal processing realized by software in a digital signal processor 11 in this Embodiment 2. FIG. 6 is a flow chart of a software algorithm for realizing these processing contents. In FIGS. 5 and 6, the same numbers or reference numerals respectively designate the same processing portions, variables or constants. Further, the same reference numerals as FIG. 2 or 3 respectively designate the same blocks or processings.

In this Embodiment 2, a lens holding mode is set in addition to the track following mode and the seek mode. As shown in FIG. 5, the disk unit additionally has a path relative to this lens holding mode and transmitting lens position data DPL to an output OUT2 through digital filters 112, 113, an adder 1030 and a selector 111 in the lens holding mode. Further, a variable added by an adder 105 is changed from $Z_2$ to $Z_5$ described later. The other constructions are similar to those in the Embodiment 1.

The digital filter 112 is constructed by adders 1032, 1036, coefficient multipliers 1033, 1034, 1037 for constant multiplication, and a unit time delay unit 1035. Constant coefficients I, J and K of these coefficient multipliers 1033, 1034, 1037 are determined such that the digital filter 112 has phase lead-lag characteristics. The digital filter 113 is constructed by coefficient multipliers 1040, 1042, an adder 1041 and a unit time delay unit 1043. Constant coefficients L and M of these coefficient multipliers 1040, 1042 are determined such that the digital filter 113 has low-pass filter characteristics. Outputs $W_4$ and $W_5$ of the digital filters 112 and 113 are added to each other by the adder 1030 and are then inputted to the selector 111.

When an output of the adder 1030 is selected by the selector 111, the objective lens 2 is moved such that the voltage of a lens position signal LP is set to zero. Accordingly, the objective lens 2 is held in a reference position of the optical head 5 for setting LP=0. This operating mode is a lens holding mode.

When the light spot is focused on an optical disk face by an unillustrated focusing servo system at a starting time of the disk unit, the lens holding mode is used before the track following mode. When the objective lens 2 is accelerated by inclination and vibration of the disk unit in this lens holding mode, a value for generating driving force having a magnitude and a direction for canceling this acceleration is obtained as a variable $Z_5$ or $W_5$. This value of variable $Z_5$ is added to a speed error by the adder 105. Accordingly, similar to the above Embodiment 1, influences of the inclination, etc. on the disk unit are compensated and a seeking operation can be performed in a state in which the speed error is held within a suitable range.

Software shown in FIG. 6 is periodically executed by interruption. A step 218 shown in FIG. 6 corresponds to the step 202 shown in FIG. 2. However, in this step 218, it is also judged whether command CMD is Hold indicative of the lens holding mode. When this command CMD=Hold is formed, processings from step 219 to step 225 are executed and common processings from step 214 to step 216 in each of the lens holding mode, track following mode and seek modes are then executed and terminated. In the steps 219 to 223, operations of the digital filters 112 and 113 shown in FIG. 5 are performed and an adding operation of the adder 1030 is performed and these processed and added values are transmitted to the output OUT2.

A variable added by the adder 105 is changed to $Z_5$. Therefore, the step 212 shown in FIG. 3 is changed to a step 224 with respect to processing at the time of CMD=Seek.

Embodiment 3

Figure 7:
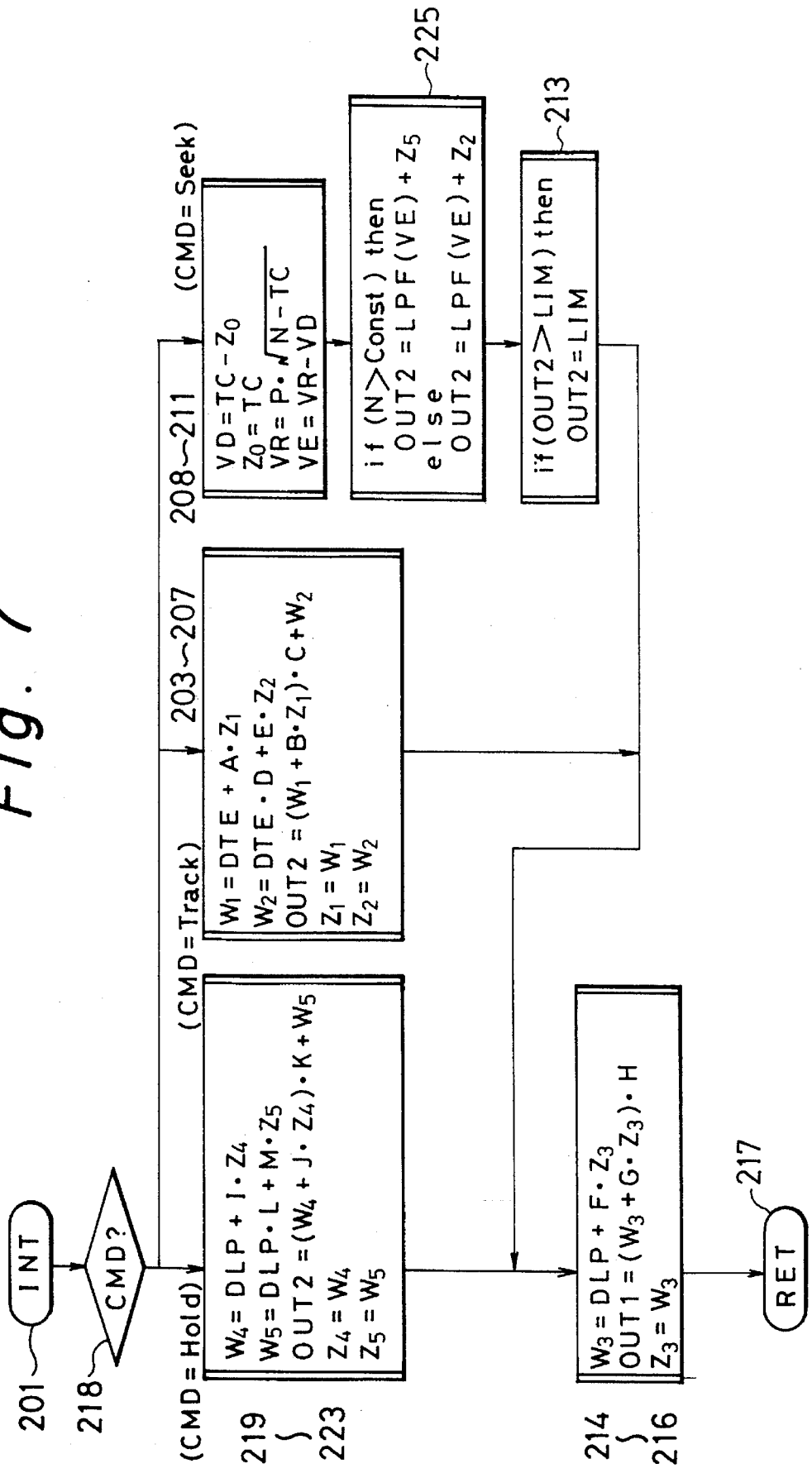
FIG. 7 is a simplified flow chart showing a processing algorithm of a digital signal processor in Embodiment 3.
Figure 8:
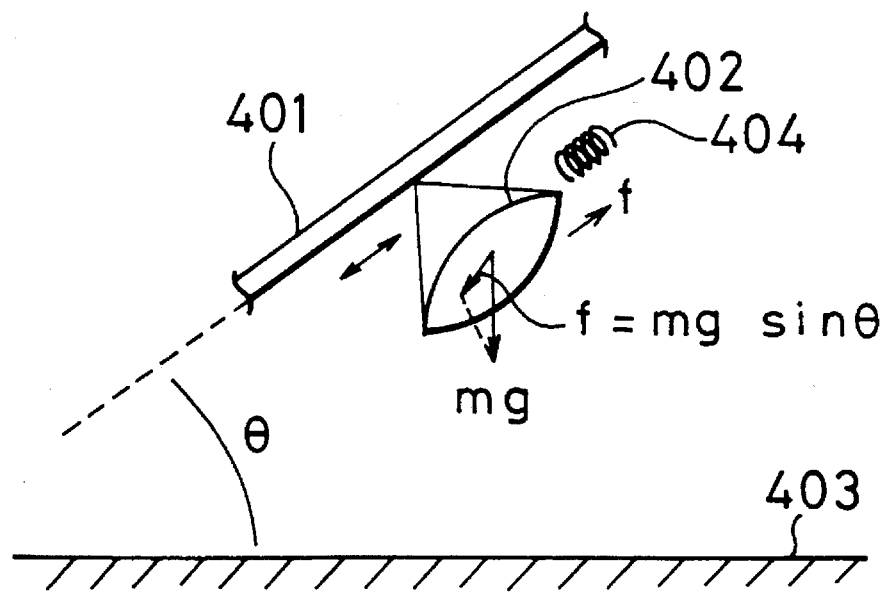
FIG. 8 is a view for explaining the influence of an inclination of the optical disk unit.

FIG. 7 shows a software algorithm for signal processing of a digital signal processor 111. This software is also executed by periodic interruption. As can be seen from comparison of FIGS. 7 and 5, contents in a processing step 225 in the case of CMD=Seek are changed. This step 225 corresponds to the step 224 shown in FIG. 6. The other constructions are similar to those in the above Embodiment 2.

In the step 225, when the number N of seek tracks is larger than a certain predetermined value Const and a seek distance is therefore larger than a certain predetermined value, $Z_5$ shown in FIG. 5 is added to a speed error LPF(VE) obtained after a smoothing operation using the low-pass filter 104 shown in FIG. 2. Namely, a value indicative of a low frequency driving force in the lens holding mode is added to this speed error. In contrast to this, when N≦Const is formed, $Z_2$ shown in FIG. 2 is added to the speed error LPF(VE). Namely, a value indicative of a low frequency driving force in the track following mode is added to the speed error.

Figure 9:
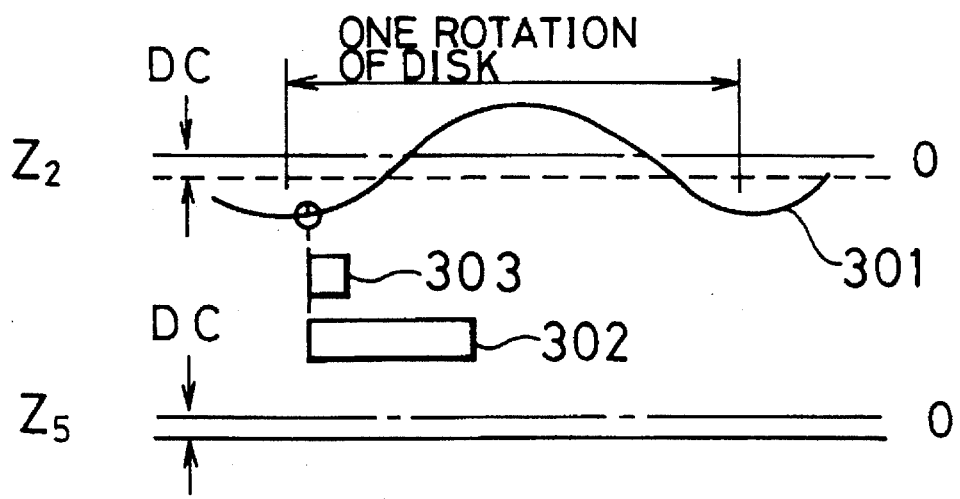
FIG. 9 is an explanatory view showing the relation between a seek distance and the influence of eccentricity of an optical disk.

$Z_5$ and $Z_2$ are selectively used for the following reasons. The speed error at a seek time is also caused by eccentricity of an optical disk. In FIG. 9, for example, a tracking error in a light spot is changed by the eccentricity of the optical disk as shown by a curve 301. $Z_2$ includes a component for making the light spot follow up such an eccentric track. When the seeking operation is completely performed for a time sufficiently shorter than a time for one rotation of the optical disk, influences of the eccentricity of the optical disk during the seeking operation are considered to be approximately equal to those just before the seeking operation is started. Accordingly, for example, $Z_2$ is added to the speed error in the case of short seek as shown by reference numeral 303 in FIG. 9 so that a driving force amount caused by the eccentricity of the optical disk is compensated. Accordingly, the seeking operation is performed stably and reliably. In contrast to this, for example, a seek time is long in the case of long seek as shown by reference numeral 302 in FIG. 9. In this case, reverse effects are provided in a certain case by adding $Z_2$ to the speed error at a terminating time point of the seeking operation. Therefore, in the case of the long seek, it is advantageous to add $Z_5$ to the speed error in comparison with $Z_2$.

As mentioned above in detail, when an information recorder such as a disk unit is inclined and an external vibrational force is applied to the information recorder and eccentricity of a recording medium is large, influences of these inclination, vibration and eccentricity are compensated so that a seeking operation can be performed stably and accurately.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information recorder comprising:

light spot displacing means for displacing a light spot irradiated onto a rotating disk-shaped recording medium in a direction crossing a track on the recording medium;

tracking error detecting means for detecting a deviation in relative position between the light spot and a track to be followed up and outputting a tracking error signal;

speed detecting means for detecting a track crossing speed of the light spot;

target speed generating means for generating a target speed of the light spot;

phase compensating means for receiving the tracking error signal from the tracking error detecting means and advancing a phase of the tracking error signal;

extracting means for receiving the tracking error signal from the tracking error detecting means and extracting a low frequency region component of the tracking error signal;

subtracting means for obtaining a difference in speed between the track crossing speed and the target speed;

first adding means for adding the low frequency region component extracted by the extracting means to the phase advanced component obtained by the phase compensating means;

second adding means for adding the low frequency region component extracted by the extracting means to the difference in speed obtained by the subtracting means; and driving means for operating the light spot displacing means so as to make the light spot follow up an arbitrary track on the recording medium in accordance with an output of the first adding means in a track following mode and to make the light spot cross the track in accordance with an output of the second adding means in a seek mode.

2. An information recorder comprising:

light spot displacing means for displacing a light spot irradiated onto a rotating disk-shaped recording medium in a direction crossing a track on the recording medium;

lens position detecting means for detecting a deviation in an optical axis of the light spot with respect to a reference position and outputting a lens position signal;

speed detecting means for detecting a track crossing speed of the light spot;

target speed generating means for generating a target speed of the light spot;

phase compensating means for receiving the lens position signal from the lens position detecting means and advancing a phase of the lens position signal;

extracting means for receiving the lens position signal from the lens position detecting means and extracting a low frequency region component of the lens position signal;

subtracting means for obtaining a difference in speed between the track crossing speed and the target speed;

adding means for adding the low frequency region component extracted by the extracting means to the difference in speed obtained by the subtracting means; and driving means for operating the light spot displacing means so as to hold the optical axis of the light spot in the reference position in accordance with an output of the phase compensating means in a holding mode and to make the light spot cross the track in accordance with an output of the adding means in a seek mode.

3. An information recorder comprising:

light spot displacing means for displacing a light spot irradiated onto a rotating disk-shaped recording medium in a direction crossing a track on the recording medium;

lens position detecting means for detecting a deviation in an optical axis of the light spot with respect to a reference position and outputting a lens position signal;

speed detecting means for detecting a track crossing speed of the light spot;

target speed generating means for generating a target speed of the light spot;

phase compensating means for receiving the lens position signal from the lens position detecting means and advancing a phase of the lens position signal;

extracting means for receiving the lens position signal from the lens position detecting means and extracting a low frequency region component of the lens position signal;

subtracting means for obtaining a difference in speed between the track crossing speed and the target speed;

first adding means for adding the low frequency region component extracted by the extracting means to the phase advanced component obtained by the phase compensating means;

second adding means for adding the low frequency region component extracted by the extracting means to the difference in speed obtained by the subtracting means; and driving means for operating the light spot displacing means so as to hold the optical axis of the light spot in the reference position in accordance with an output of the first adding means in a holding mode and to make the light spot cross the track in accordance with an output of the second adding means in a seek mode.

4. An information recorder comprising:

light spot displacing means for displacing a light spot irradiated onto a rotating disk-shaped recording medium in a direction crossing a track on the recording medium;

tracking error detecting means for detecting a deviation in a relative position between the light spot and a track to be followed up and outputting a tracking error signal;

lens position detecting means for detecting a deviation in an optical axis of the light spot with respect to a reference position and outputting a lens position signal;

speed detecting means for detecting a track crossing speed of the light spot;

target speed generating means for generating a target speed of the light spot;

first phase compensating means for receiving the tracking error signal from the tracking error detecting means and advancing a phase of the tracking error signal;

second phase compensating means for receiving the lens position signal from the lens position detecting means and advancing a phase of the lens position signal;

first extracting means for receiving the tracking error signal from the tracking error detecting means and extracting a low frequency region component of the tracking error signal;

second extracting means for receiving the lens position signal from the lens position detecting means and extracting a low frequency region component of the lens position signal;

subtracting means for obtaining a difference in speed between the track crossing speed and the target speed;

first adding means for adding the low frequency region component of the tracking error signal extracted by the first extracting means to the phase advanced component of the tracking error signal obtained by the first phase compensating means;

second adding means for adding the low frequency region component of the tracking error signal extracted by the first extracting means to the difference in speed obtained by the subtracting means;

third adding means for adding the low frequency region component of the lens position signal extracted by the second extracting means to the difference in speed obtained by the subtracting means; and driving means for operating the light spot displacing means so as to hold the optical axis of the light spot in the reference position in accordance with an output of the second phase compensating means in a holding mode and to make the light spot follow up an arbitrary track on the recording medium in accordance with an output of the first adding means in a track following mode, said driving means operating the light spot displacing means in a seek mode so as to make the light spot cross the track in accordance with an output of the second adding means when a seek distance is equal to or smaller than a predetermined value and in accordance with an output of the third adding means when the seek distance is greater than the predetermined value.

5. An information recorder comprising:

light spot displacing means for displacing a light spot irradiated onto a rotating disk-shaped recording medium in a direction crossing a track on the recording medium;

tracking error detecting means for detecting a deviation in relative position between the light spot and a track to be followed up and outputting a tracking error signal;

lens position detecting means for detecting a deviation in an optical axis of the light spot with respect to a reference position and outputting a lens position signal;

speed detecting means for detecting a track crossing speed of the light spot;

target speed generating means for generating a target speed of the light spot;

first phase compensating means for receiving the tracking error signal from the tracking error detecting means and advancing a phase of the tracking error signal;

second phase compensating means for receiving the lens position signal from the lens position detecting means and advancing a phase of the lens position signal;

first extracting means for receiving the tracking error signal from the tracking error detecting means and extracting a low frequency region component of the tracking error signal;

second extracting means for receiving the lens position signal from the lens position detecting means and extracting a low frequency region component of the lens position signal;

subtracting means for obtaining a difference in speed between the track crossing speed and the target speed;

first adding means for adding the low frequency region component of the tracking error signal extracted by the first extracting means to the phase advanced component of the tracking error signal obtained by the first phase compensating means;

second adding means for adding the low frequency region component of the tracking error signal extracted by the first extracting means to the difference in speed obtained by the subtracting means;

third adding means for adding the low frequency region component of the lens position signal extracted by the second extracting means to the phase advanced component of the lens position signal obtained by the second phase compensating means;

fourth adding means for adding the low frequency region component of the lens position signal extracted by the second extracting means to the difference in speed obtained by the subtracting means; and driving means for operating the light spot displacing means so as to hold the optical axis of the light spot in the reference position in accordance with an output of the third adding means in a holding mode and to make the light spot follow up an arbitrary track on the recording medium in accordance with an output of the first adding means in a track following mode, said driving means operating the light spot displacing means in a seek mode so as to make the light spot cross the track in accordance with an output of the second adding means when a seek distance is equal to or smaller than a predetermined value and in accordance with an output of the fourth adding means when the seek distance is greater than the predetermined value.

* * * * *